(12) United States Patent
Wartig et al.

(10) Patent No.: US 11,365,302 B2
(45) Date of Patent: Jun. 21, 2022

(54) LIQUID MODIFIER AS CARRIER SYSTEM FOR CFAS IN FOAMED POLYSTYRENES

(71) Applicant: CLARIANT PLASTICS & COATINGS LTD, Muttenz (CH)

(72) Inventors: Karen-Alessa Wartig, Hamburg (DE); Mirco Gröseling, Ahrensburg (DE); Tim Van Den Abbeele, Ahrensburg (DE); Patrick Kohnke, Hamburg (DE); Rinaldo Montani, Gorla Maggiore (IT)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

(21) Appl. No.: 16/078,394

(22) PCT Filed: Feb. 20, 2017

(86) PCT No.: PCT/EP2017/053745
§ 371 (c)(1),
(2) Date: Aug. 21, 2018

(87) PCT Pub. No.: WO2017/144396
PCT Pub. Date: Aug. 31, 2017

(65) Prior Publication Data
US 2019/0048162 A1 Feb. 14, 2019

(30) Foreign Application Priority Data

Feb. 22, 2016 (EP) .................................... 16156706

(51) Int. Cl.
*C08J 9/08* (2006.01)
*C08J 9/00* (2006.01)

(52) U.S. Cl.
CPC ............... *C08J 9/08* (2013.01); *C08J 9/0023* (2013.01); *C08J 2201/022* (2013.01); *C08J 2201/024* (2013.01); *C08J 2203/02* (2013.01); *C08J 2203/12* (2013.01); *C08J 2325/04* (2013.01); *C08J 2325/06* (2013.01)

(58) Field of Classification Search
CPC ..... C08J 5/18; C08J 9/0023; C08J 9/06; C08J 9/08; C08J 9/228; C08J 2201/022; C08J 2201/024; C08J 2203/02; C08J 2203/12; C08J 2325/04; C08J 2325/06
See application file for complete search history.

(56) References Cited

U.S. PATENT DOCUMENTS

| 4,167,503 | A | * | 9/1979 | Cipriani | ..................... C08J 3/22 106/499 |
| 4,572,740 | A | * | 2/1986 | Kretzschmann | ........... C08J 9/08 106/122 |
| 4,889,669 | A | * | 12/1989 | Suzuki | .................... B29C 48/07 264/45.9 |
| 4,904,702 | A | * | 2/1990 | Allen | ........................ C08J 9/06 521/139 |
| 4,940,735 | A | | 7/1990 | Kress | |
| 5,009,809 | A | | 4/1991 | Kosin et al. | |
| 5,218,006 | A | | 6/1993 | Reedy et al. | |
| 6,589,646 | B1 | * | 7/2003 | Morgenstern | ........... B32B 27/08 428/318.6 |
| 2012/0252913 | A1 | * | 10/2012 | Leeming | .................... C08J 9/06 521/79 |
| 2018/0230288 | A1 | * | 8/2018 | Lesho | ...................... C08K 3/22 |

FOREIGN PATENT DOCUMENTS

JP 2007332338 A * 12/2007
RU 2542296 C2 2/2015

OTHER PUBLICATIONS

Chinese Office Action dated Dec. 22, 2020 issued in Chinese Patent Application No. 201780007896.8 (with English translation).
Brazilian Office Action dated Mar. 26, 2021 issued in Brazilian Patent Application No. BR112018012750-7 (with partial English translation).
English translation of Japanese Office Action dated Feb. 18, 2021 issued in Japanese Patent Application No. 2018-543641.
International Preliminary Report on Patentability dated Aug. 28, 2018, issued in corresponding International Patent Application No. PCT/EP2017/053745.
Partial English translation of 2nd Office Action dated Nov. 17, 2021, issued in Japanese Patent Application No. 2018-543641.
Office Action dated Nov. 23, 2021, issued in Russian Patent Application No. 2018132832.

* cited by examiner

*Primary Examiner* — Irina S Zemel
(74) *Attorney, Agent, or Firm* — Morgan, Lewis & Bockius LLP

(57) ABSTRACT

The invention relates to a liquid formulation for foaming a thermoplastic polystyrene, said formulation comprising
a) a liquid carrier; and
b) at least one endothermic chemical blowing agent selected from the group consisting of dicarboxylic acids, tricarboxylic acids, salts of dicarboxylic acids, salts of tricarboxylic acids, esters of dicarboxylic acids and esters of tricarboxylic acids.

16 Claims, No Drawings

LIQUID MODIFIER AS CARRIER SYSTEM FOR CFAS IN FOAMED POLYSTYRENES

The invention relates to a liquid formulation, particularly for foaming a thermoplastic polystyrene (PS), which is used for the production of extrusion films and sheets to improve the mechanical properties of the foamed film.

Polystyrene foams tend to be good thermal insulators and are therefore often used as building insulation materials, such as in insulating concrete forms and structural insulated panel building systems. They are also used for non-weight-bearing architectural structures (such as ornamental pillars). PS foams also exhibit good damping properties, and are therefore widely used in packaging. Extruded closed-cell polystyrene foam is sold under the trademark Styrofoam® by Dow Chemical Company, for instance. Polystyrene is also used for food packaging to produce trays and pots via thermoforming.

BACKGROUND OF THE INVENTION

Using solid formulations for introducing chemical foaming agents into thermoplastic polymers is well known. Such solid formulations like pellets or powder can lead to merging problems because they are unsolvable and need to be dispersed in the thermoplastic polymer. For obtaining an evenly distributed cell structure, the chemical foaming agent (CFA) needs to be well distributed within the polymer matrix. Also the mechanical properties, especially the flexural mode of the foamed film can be negatively influenced by foaming. The cell size of the foam influences the mechanical properties such as compressive strength, modulus, or creep resistance and also the carrier system of the CFA may deteriorate flexibility of the material.

It is an object of the present invention to enhance the flexibility (strain at break) of foamed polystyrene articles, especially films and sheets, while maintaining an adequate stiffness of the material (Young's modulus).

SUMMARY OF THE INVENTION

According to a first aspect of the invention, a liquid formulation for foaming of a thermoplastic polystyrene is provided, said formulation comprising: a liquid carrier; and a particular chemical blowing agent; wherein the liquid carrier works as a modifier or plasticizer in thermoplastic polystyrene.

Subject of the present invention is therefore a liquid formulation for foaming a thermoplastic polystyrene, said formulation comprising
a) 25 to 90 wt. % of a liquid carrier; and
b) at least one endothermic chemical blowing agent selected from the group consisting of tricarboxylic acids, salts of tricarboxylic acids and esters of tricarboxylic acids.

The liquid formulation of the present invention preferably is a dispersion, wherein the endothermic chemical blowing agent is dispersed in the liquid carrier. Solids in the liquid formulation are finely dispersed.

Said liquid formulation preferably comprises from 10 to 90 wt.-%, more preferably from 20 to 80 wt.-%, even more preferably from 30 to 75 wt.-%, most preferably from 40 to 70 wt.-%, of the said chemical foaming agent, based on the total weight of the liquid formulation.

The at least one endothermic chemical blowing agent is preferably selected from organic acids and acid derivatives, such as oxalic acid, oxalic acid salts, oxalic acid esters, succinic acid, succinic acid salts, succinic acid esters, adipic acid, adipic acid salts, adipic acid esters, phthalic acid, phthalic acid salts, phthalic acid esters, citric acid, citric acid salts and citric acid esters. Esters preferably are $C_1$-$C_{18}$-alkyl esters.

Salts preferably are alkali metal salts, e.g. sodium salts.

More preferred are citric acid, citric acid salts, and citric acid esters, and mixtures thereof. Preferred citric acid esters are those of higher alcohols, such as stearyl or lauryl citrate, and both mono- and diesters of citric acid with lower alcohols having 1-8 carbon atoms. Suitable lower alcohols from which these citric acid esters can be formed are, for example: Methanol, ethanol, propanol, isopropanol, n-butanol, iso-butanol, sec-butanol, tert-butanol, n-pentanol, n-pentan-2-ol, n-pentan-3-ol, n-hexan-3-ol and isomeric hexanols, n-heptan-1-ol, n-heptan-2-ol, n-heptan-3-ol, n-heptan-4-ol and isomeric heptanols, n-octan-1-ol, n-octan-2-ol, n-octan-3-ol, n-octan-4-ol and isomeric octanols, cyclopentanol, and cyclohexanol. Furthermore, diols or polyols with 1-8 carbon atoms may be used, such as ethylene glycol, glycerol, pentaerythritol or lower polyethylene glycols, for example diethylene glycol, triethylene glycol or tetraethylene glycol. The mono- or diesters with monohydric alcohols having 1-6 carbon atoms are preferred and the mono- or diesters with monohydric alcohols having 1-4 carbon atoms are most preferred. The monoesters, such as monomethyl citrate, monoethyl citrate, monopropyl citrate, monoisopropyl citrate, mono-n-butyl citrate, and mono-tert-butyl citrate are particularly preferred.

Preferred citric acid salts are alkali metal citrates, such as sodium monocitrate.

Said organic acids are preferred as endothermic blowing agent in the present invention because of a homogeneous and finer cell structure of the foam which results in a better mechanical stability of the foamed article, e.g. film or sheet, compared to other endothermic CFA like bicarbonates.

The liquid formulation of the present invention preferably comprises from 25 to 90 wt.-%, more preferably from 25 to 80 wt.-%, even more preferably from 25 to 70 wt.-%, most preferably from 30 to 60 wt.-%, of the liquid carrier, based on the total weight of the liquid formulation.

The liquid carrier of the present invention may be an aqueous medium, an organic solvent-based medium, an oil-based medium or a combination thereof.

Preferably, the liquid carrier comprises a vegetable oil, a mineral oil, an acetylated monoglyceride or a mixture thereof.

Vegetable oils are for example palm kernel oil, coconut oil, rapeseed oil, sunflower oil, linseed, palm oil, soybean oil, peanut oil, cotton seed oil, corn oil, poppy oil, olive oil, castor oil, or comprise palmitic acid, capric acid, lauric acid, stearic acid, oleic acid, linoleic acid, linolenic acid, caproic acid, arachidonic acid, behenic acid, gadoleic acid, erucic acid, ricinoleic acid and salts thereof.

Especially preferred are liquid carriers based on acetylated monoglycerides, for example prepared from fully hydrogenated castor oil in combination with glycerine and acetic acid, or (3-acetoxy-2-hydroxy-propyl) octadecanoate.

Another preferred liquid carrier is based on paraffinum liquidum.

Another preferred liquid carrier comprises sorbitan oleates, e.g. sorbitan monooleate, or ethoxylated sorbitan oleates, e.g. sorbitan trioleate ethoxylate, and mixtures thereof with the above mentioned vegetable oils, mineral oils and/or acetylated monoglycerides.

Liquid systems in the sense of the present invention (liquid carrier, liquid formulation) are meant to have a dynamic viscosity η between $10^{-1}$ and $10^{10}$ mPas, preferably between $10^{-1}$ and $10^5$ mPas, at 23° C. and 1 bar.

The formulation of the present invention may further comprise customary additives in a concentration range that does not adversely affect the beneficial effect of the invention, e.g. 0.0001 to 15% by weight, preferably 0.01 to 10% by weight, especially 0.1 to 5% by weight, based on the total weight of the formulation. Suitable customary additives include colorants, e.g. pigments and dyes, stabilizers, antioxidants, antibacterial agents, thermostabilizers, light stabilizers, neutralizers, antistatic agents, antiblocking agents, optical brighteners, heavy metal inactivation agents, hydrophobic agents, peroxides, water scavengers, acid scavengers, hydrotalcites, elastomers, impact modifiers, laser marking additives, processing aids and the like, and also mixtures thereof.

A preferred liquid formulation comprises
a) 25 to 90 wt.-%, preferably 25 to 80 wt.-%, more preferably 25 to 70 wt.-%, most preferably 30 to 60 wt.-%, of a liquid carrier,
b) 90 to 10 wt.-%, preferably 80 to 20 wt.-%, more preferably 75 to 30 wt.-%, most preferably 70 to 40 wt.-%, of said at least one endothermic chemical blowing agent, and optionally
c) 0.0001 to 15 wt.-%, preferably 0.01 to 10 wt.-%, more preferably 0.1 to 7.5 wt.-%, of further customary additives, as specified above, based on the total weight (100%) of the liquid formulation.

The liquid formulation of the present invention can be prepared by mixing said liquid carrier with said at least one endothermic chemical blowing agent, and optionally the further customary additives, in the amounts as specified above. In the mixing phase, it is expedient to add all powderous material to the liquid carrier under mixing until a dispersion is formed, e.g. after 15 to 30 minutes. Advantageously, the mixing continues at a temperature of 40 to 50° C. As mixing apparatuses it is possible to use any mixing device customary in the art, e.g. a high speed mixer with a cowls disc.

Another subject of the invention is a polymer composition comprising a thermoplastic polystyrene as described hereinafter and the liquid formulation of the invention.

Said polymer composition is usually a "compound" in which the additives are present in the desired final concentration of the final application or final article and the polymer is the desired polystyrene of the final article or final application.

Expediently, the concentration of the liquid formulation is from 0.1 to 10 wt.-%, preferably from 0.5 to 7.5 wt.-%, more preferably from 1 to 5 wt.-%, based on the total weight of the polymer composition.

It is also possible that said polymer composition contains the additives in a concentration which is still higher than in the desired final application or final article, so that said polymer composition needs to be diluted with further polystyrene on manufacturing the final article.

Said polymer composition can be manufactured by contacting said liquid formulation with said polystyrene, e.g. in an extruder.

Another subject of the present invention is the use of the liquid formulation for preparing a foamed thermoplastic polystyrene material, especially a film or a sheet.

Still another subject of the present invention is a method of making a polystyrene foam material, the method comprising contacting a thermoplastic polystyrene and the liquid formulation or the polymer composition of the invention during melt processing, e.g. in an extruder, under such conditions that the liquid formulation produces gas which foams the polystyrene, e.g. at a temperature in the range of 100 to 220° C. Preferably, the liquid formulation is introduced directly into an extruder, for example via a feed throat of the extruder. After foaming the polymer material is cooled and formed into the desired shape, e.g. a sheet or a film.

Expediently, said polystyrene is a styrene homopolymer, an alkylstyrene homopolymer, preferably a $C_1$-$C_4$-alkylstyrene homopolymer, for example α-methylstyrene homopolymer; a styrene copolymer, especially a high impact polystyrene (HIPS), or a mixture of said polystyrenes and HIPS.

High impact polystyrenes (HIPS) are generally prepared by polymerization by grafting mixtures of styrene and optionally one or more copolymerizable vinyl monomers, preferably mixtures of styrene, methylstyrene, ethylstyrene, butylstyrene, halostyrenes, vinylalkylbenzenes, such as vinyltoluene, vinylxylene, acrylonitrile, methacrylonitrile, lower alkyl esters of methacrylic acid, in the presence of a rubbery polymer trunk comprising copolymers chosen from polybutadiene, polyisoprene, rubbery styrene-diene copolymers, acrylic rubber, nitrile rubber and olefinic rubbers, such as propylene diene monomer rubber (PDM) and propylene rubber (PR). In the high impact polystyrene, the rubbery polymer trunk normally constitutes from 5 to 80% by weight, preferably 5 to 50% by weight, of the total weight of the grafted polymer.

Preferably, the polystyrene has a melt flow index (MFI) of 0.5 to 50 (5 kg/200° C.), more preferably an MFI of 1 to 25 (5 kg/200° C.), and most preferably an MFI of 3 to 11 (5 kg/200° C.), according to ISO 1133.

Preferably, the polystyrene has an average molecular weight of 30 000 to 500 000 g/mol, more preferably of 100 000 to 400 000 g/mol, and most preferably of 150 000 to 300 000 g/mol.

According to another embodiment, ultra high molecular weight polystyrene, which preferably has an average molecular weight of 1 200 000 to 3 500 000 g/mol can be employed.

In another embodiment of the present invention recycled polystyrene or recycled high impact polystyrene can be employed up to 100%. More preferably 5 to 20% by weight of the total polystyrene content consists of recycled polystyrene.

The liquid formulation of the present invention provides advantages over known solid formulations because it allows a more even distribution of the CFA within the thermoplastic polymer, thereby forming a finer and more uniform cell structure and a smooth surface of the extruded pieces is achieved. The achieved cell volume is advantageously from 100 to 300 µm$^3$, preferably from 120 to 200 µm$^3$. In addition, the formulation can be accurately dosed into the polymer and is easy to handle.

EXAMPLES

The following materials are used:
CFA 1a: monosodium citrate
CFA 2b: sodium bicarbonate (comparison)
PS: 158 N Styrolution:Styrolution PS 486N HIPS=1:1
PE: LDPE Sabic 1965N0 (comparison)
Liquid Media:
4B: paraffinum liquidum (density 0.85 g/ml at 20° C.)
6B acetylated monoglyceride:
Preparation of Liquid Dispersions:

Example 1

500 g of dispersion were prepared by initially mixing liquid medium 4B (400 g) and 100 g of CFA 1a. Mixing was initially undertaken manually to start incorporating the solid materials in the liquid. Subsequently, mixing was continued in a high speed mixer with cowls disc with 3000 rounds per minute for 15 to 30 minutes, while increasing the temperature to 40 to 50° C.

Thus, a dispersion was prepared comprising
Liquid medium 4B: 80 wt.-%
Monosodium citrate: 20 wt.-%

Example 2

500 g of dispersion were prepared by initially mixing liquid medium 4B (300 g) and 200 g of CFA 1a. Mixing was initially undertaken manually to start incorporating the solid materials in the liquid. Subsequently, mixing was continued in a high speed mixer with cowls disc with 3000 rounds per minute for 15 to 30 minutes, while increasing the temperature to 40 to 50° C.

Thus, a dispersion was prepared comprising
Liquid medium 4B: 60 wt.-%
Monosodium citrate: 40 wt.-%

Example 3

500 g of dispersion were prepared by initially mixing liquid medium 6B (400 g) and 100 g of CFA 1a. Mixing was initially undertaken manually to start incorporating the solid materials in the liquid. Subsequently, mixing was continued in a high speed mixer with cowls disc with 3000 rounds per minute for 15 to 30 minutes, while increasing the temperature to 40 to 50° C.

Thus, a dispersion was prepared comprising
Liquid medium 6B: 80 wt.-%
Monosodium citrate: 20 wt.-%

Example 4

500 g of dispersion were prepared by initially mixing liquid medium 6B (300 g) and 200 g of CFA 1a. Mixing was initially undertaken manually to start incorporating the solid materials in the liquid. Subsequently, mixing was continued in a high speed mixer with cowls disc with 3000 rounds per minute for 15 to 30 minutes, while increasing the temperature to 40 to 50° C.

Thus, a dispersion was prepared comprising
Liquid medium 6B: 60 wt.-%
Monosodium citrate: 40 wt.-%

Example 5 (Comparative)

Solid Formulation 500 g of a solid formulation were prepared by initially mixing 400 g of polyethylene pellets (LDPE, SABIC 1965N0) and 100 g of CFA 1a. Subsequently, the physical mixing was accomplished by melting the mixture in an extruder at a temperature of ° C. and forming pellets thereof.

Thus, a solid formulation was prepared comprising
PE: 80 wt.-%
Monosodium citrate: 20 wt.-%.

Example 6 (Comparative)

Liquid Formulation, Bicarbonate as CFA 2b 500 g of dispersion were prepared by initially mixing liquid medium 4B (400 g) and 100 g of CFA 2b. Mixing was initially undertaken manually to start incorporating the solid materials in the liquid. Subsequently, mixing was continued in a high speed mixer with cowls disc with 3000 rounds per minute for 15 to 30 minutes, while increasing the temperature to 40 to 50° C.

Thus, a dispersion was prepared comprising
Liquid medium 4B: 80 wt.-%
Sodium bicarbonate: 20 wt.-%

Example 7 (Comparative)

Liquid Formulation, Bicarbonate as CFA 2b 500 g of dispersion were prepared by initially mixing liquid medium 6B (400 g) and 100 g of CFA 2b. Mixing was initially undertaken manually to start incorporating the solid materials in the liquid. Subsequently, mixing was continued in a high speed mixer with cowls disc with 3000 rounds per minute for 15 to 30 minutes, while increasing the temperature to 40 to 50° C.

Thus, a dispersion was prepared comprising
Liquid medium 6B: 80 wt.-%
Sodium bicarbonate: 20 wt.-%

Manufacture of the Films:

Different parts of the liquid (or solid) formulations (ref. on Table 1) of Examples 1 to 7 were mixed with different parts of PS (158 N Styrolution:Styrolution PS 486N HIPS=1:1) on a coex-film line at a temperature of 180-220° C. ° C. The film structure was a three-layer film ABA (25%/50%/25%) where the middle layer was equipped with the CFA formulation. The results are shown in Table 2

TABLE 1

| Example | Type of CFA | Carrier system | CFA content in batch [%] | CFA content in film [%] | Part of carrier (liquid or solid) in film [%] |
|---|---|---|---|---|---|
| 1 | 1a | 4B | 20 | 0.35 | 1.75 |
| 2 | 1a | 4B | 40 | 0.5 | 1.25 |
| 3 | 1a | 6B | 20 | 0.35 | 1.75 |
| 4 | 1a | 6B | 40 | 0.5 | 1.25 |
| 5 (comp.) | 1a | PE | 20 | 0.35 | 1.75 |
| 6 (comp.) | 2b | 4B | 20 | 0.35 | 1.75 |
| 7 (comp.) | 2b | 6B | 20 | 0.35 | 1.75 |

TABLE 2

Test results

| Example | Cell size in machine direction horizontal/vertical [μm] | Cell size in transverse direction horizontal/vertical [μm] | Density [g/ml] | Cell volume [μm³] | Young's modulus [MPa] | Strain at break [%] |
|---|---|---|---|---|---|---|
| 1 | 42/114 | 37/60 | 0.848 | 153 | 1700 | 11 |
| 2 | 47/106 | 35/65 | 0.835 | 167 | 1700 | 11 |
| 3 | 34/140 | 35/70 | 0.858 | 167 | 1850 | 11 |
| 4 | 36/110 | 38/62 | 0.828 | 129 | 1700 | 11 |
| 5 (comp) | 65/117 | 55/98 | 0.815 | 388 | 1700 | 7 |
| 6 (comp) | 63/155 | 50/89 | 0.838 | 454 | 1700 | 9 |
| 7 (comp) | 50/178 | 52/94 | 0.836 | 438 | 1750 | 10 |

Investigations on mechanical properties were performed using a stress-strain machine (Zwick/Roell Frank8103Mops-F, Ulm, Germany) compliant with ISO 527-1/2 to obtain the Young's Modulus and strain at break. The results are the averaged values of five measurements.

As it is shown in table 2 the liquid carrier system effects a cell size reduction of about 60%. The carrier system (liquid or solid carrier) also influences the mechanical properties of the foamed part. While the stiffness, expressed by Young's Modulus, remains constant mainly independent of the carrier system, the flexibility of the foamed material, expressed by strain at break, is significantly influenced by the carrier system. The strain at break of liquid carrier systems increases up to 57% compared to the solid carrier system. Therefore, it is proven that liquid carrier systems cause a modifying effect to improve the mechanical properties.

It is further shown in Table 2 that the type of CFA influences the foam structure and the strain at break. Both are disadvantageously influenced when replacing the CFA according to the invention by a bicarbonate of the art.

The invention claimed is:

1. A liquid formulation for foaming a thermoplastic polystyrene, said formulation comprising
   a) 25-90 wt. %, based on the total weight of the liquid formulation, of a liquid carrier; and
   b) 10 to 75 wt.-%, based on the total weight of the liquid formulation, of at least one endothermic chemical blowing agent selected from the group consisting of tricarboxylic acids, salts of tricarboxylic acids, oxalic acid, oxalic acid salts, succinic acid, succinic acid salts, adipic acid, adipic acid salts, phthalic acid, and phthalic acid salts;
   wherein the liquid formulation does not include a (bi) carbonate foaming agent,
and wherein the liquid carrier is selected from paraffinum liquidum, acetylated monoglyceride, or a mixture thereof.

2. The formulation as claimed in claim 1, wherein the formulation is a dispersion and wherein the endothermic chemical blowing agent is dispersed in the liquid carrier.

3. The formulation as claimed in claim 1, wherein the endothermic chemical blowing agent is selected from the group consisting of succinic acid, succinic acid salts, adipic acid, adipic acid salts, phthalic acid, phthalic acid salts, citric acid, and citric acid salts.

4. The formulation as claimed in claim 1, wherein the endothermic chemical blowing agent is selected from the group consisting of citric acid, and citric acid salts.

5. The formulation as claimed in claim 1, wherein the liquid carrier comprises an aqueous medium, an organic solvent-based medium, an oil-based medium or a combination thereof.

6. The formulation as claimed in claim 1, wherein the liquid carrier comprises a vegetable oil, a mineral oil, an acetylated monoglyceride, a sorbitan oleate, an ethoxylated sorbitan oleate or a mixture thereof.

7. The formulation as claimed in claim 1, further comprising customary additives selected from the group consisting of colorants, stabilizers, antioxidants, antibacterial agents, neutralizers, antistatic agents, antiblocking agents, optical brighteners, heavy metal inactivation agents, hydrophobic agents, peroxides, water scavengers, acid scavengers, hydrotalcites, elastomers, impact modifiers, laser marking additives, processing aids and mixtures thereof.

8. The formulation as claimed in claim 1, further comprising
   c) 0.0001 to 15 wt.-% of customary additives,
   based on the total weight (100%) of the liquid formulation.

9. The formulation as claimed in claim 1, comprising
   a) 30 to 60 wt.-% of a liquid carrier,
   b) 70 to 40 wt.-%, of the at least one endothermic chemical blowing agent, and optionally
   c) 0.1 to 7.5 wt.-% of customary additives,
   based on the total weight (100%) of the liquid formulation.

10. A foamed thermoplastic polystyrene material foamed by a liquid formulation as claimed in claim 1.

11. A method of making a polystyrene foam material comprising the step of contacting a thermoplastic polystyrene and a liquid formulation according to claim 1 during melt processing under such conditions that the liquid formulation produces gas which foams the polystyrene.

12. The method as claimed in claim 11, wherein the thermoplastic polystyrene is a styrene homopolymer, an alkylstyrene homopolymer, a high-impact polystyrene or a mixture thereof.

13. A liquid formulation for foaming a thermoplastic polystyrene, said formulation comprising:
   a) 25-90 wt. %, based on total weight of the liquid formulation, of a liquid carrier selected from paraffinum liquidum, acetylated monoglyceride, or a mixture thereof; and
   b) 10-75 wt. %, based on total weight of the liquid formulation, of at least one endothermic chemical blowing agent selected from succinic acid, succinic acid salts, succinic acid esters, adipic acid, adipic acid salts, adipic acid esters, phthalic acid, phthalic acid salts, phthalic acid esters, citric acid, citric acid salts, or citric acid esters;
wherein the liquid formulation is a dispersion and wherein the endothermic chemical blowing agent is dispersed in the liquid carrier.

14. The formulation as claimed in claim 13, wherein the endothermic chemical blowing agent is selected from the group consisting of succinic acid, succinic acid salts, adipic acid, adipic acid salts, phthalic acid, phthalic acid salts, citric acid, and citric acid salts.

15. The formulation as claimed in claim 13, wherein the endothermic chemical blowing agent is selected from the group consisting of citric acid, and citric acid salts.

16. A foamed thermoplastic polystyrene material foamed by a liquid formulation as claimed in claim 13.

* * * * *